United States Patent [19]

Edelmann

[11] 4,111,392
[45] Sep. 5, 1978

[54] VALVE, ESPECIALLY A RADIATOR VALVE

[75] Inventor: Günther Edelmann, Elztal-Auerbach, Fed. Rep. of Germany

[73] Assignee: Braukmann Armaturen AG, Rothrist, Switzerland

[21] Appl. No.: 702,771

[22] Filed: Jul. 6, 1976

[51] Int. Cl.² .............................................. F16K 31/44
[52] U.S. Cl. ...................................... 251/214; 251/322
[58] Field of Search .................. 137/454.5, 454.6; 251/214, 221, 222, 223, 224, 225, 226, 227, 318, 319, 320, 321, 322, 323; 236/34, 34.5

[56] References Cited

U.S. PATENT DOCUMENTS

| 3,356,335 | 12/1967 | Koch et al. | 251/214 |
| 3,445,088 | 5/1969 | Gallagher et al. | 251/214 |
| 3,490,735 | 1/1970 | Nielsen et al. | 251/214 |
| 3,910,553 | 10/1975 | Boylan | 251/225 |

FOREIGN PATENT DOCUMENTS

| 647,147 | 4/1964 | Belgium | 137/454.5 |
| 2,253,462 | 3/1974 | Fed. Rep. of Germany | 137/454.6 |
| 1,044,900 | 10/1966 | United Kingdom | 251/214 |

Primary Examiner—Martin P. Schwadron
Assistant Examiner—G. L. Walton
Attorney, Agent, or Firm—William T. Howell

[57] ABSTRACT

A radiator valve has a housing carrying a valve stem with plate and loading spring on the valve stem above the valve plate; a first seal bears against the valve stem between the valve plate and the spring. A presetting member is located in the housing and it carries a second seal bearing against the valve stem at a position removed from the valve plate with respect to the first seal.

3 Claims, 1 Drawing Figure

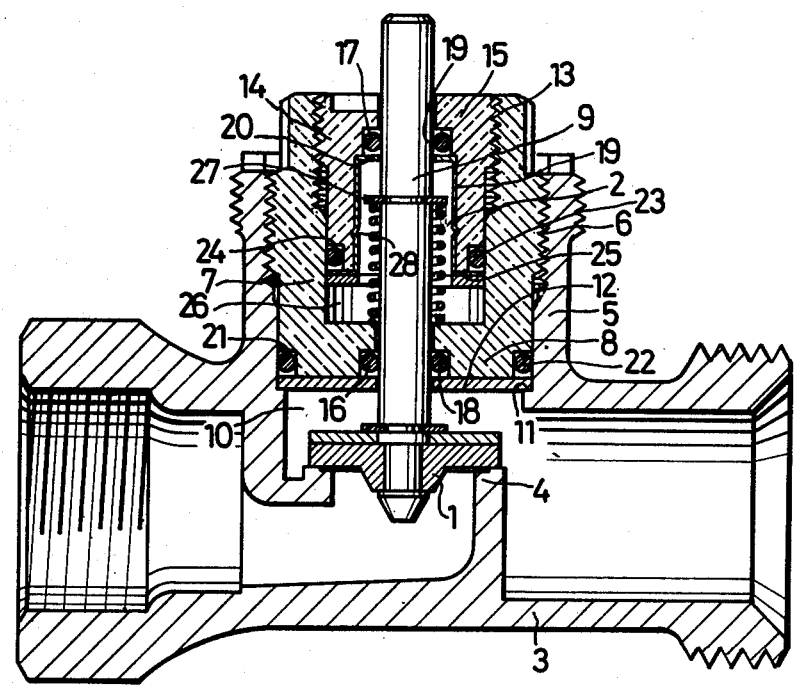

VALVE, ESPECIALLY A RADIATOR VALVE

FIELD OF THE INVENTION

The invention relates to a valve, especially a radiator valve, having a pre-setting member and a loading spring for the valve stem, with at least two sealing rings, staggered in the longitudinal direction, bearing against the valve stem.

PRIOR ART

Valves of this kind are normally used as thermostat radiator valves and, for reasons of safety, they have two seals arranged one behind the other upon the valve stem, the second seal carrying out its function only when the first is no longer serviceable. Now, if the second, i.e. the outermost seal has to be replaced, this requires the removal of the loading, or tensioning, spring for the valve stem, and the withdrawal of other parts built into the valve. Since this is time consuming and therefore costly, it is the purpose of the present invention to provide a valve of the type described above, in which the second seal may be removed at no great cost, especially without removing the valve stem tensioning spring.

SUMMARY OF THE INVENTION

This purpose may be achieved in that part of the presetting member through which the valve stem passes is farther away from the valve plate, or the like, than the loading spring and the second sealing ring, which seals the presetting member in relation to the valve stem, comes automatically at a location on the valve stem outside the loading spring, i.e. it is farther away from the valve plate, or the like, than the loading spring. As a result of this, the second sealing ring may be replced without any difficulty by removing the presetting member, and all of the other internal parts, especially the loading spring, may be left in place.

According to one particular preferred example of embodiment of the invention, the first sealing ring associated with the valve plate, or the like, is inserted into a cup-shaped element assembled, or more particularly screwed, into the neck area of the valve, the bottom of which separates the interior of the valve from the neck area. In this connection, and according to one very advantageous development of the invention, the bottom of the cup-shaped element rests upon a disc, the outside diameter of which corresponds to the diameter of the said bottom, and which is supported by a step or the like in the valve housing, the valve stem passing concentrically through the said disc and constituting, in conjunction with the bottom of the cup, an internal groove, i.e. a groove associated with the valve stem, for the first sealing ring. This provides advantages both in assembly and in production. From the production point of view, the advantage is that the radial groove is eliminated and a central passage for the valve stem is sufficient. From the point of view of assembly, this is simplified and accelerated by the fact that the sealing ring need be snapped into the retaining groove, but is merely placed in the expanded portion of the passage.

The same advantages are provided in another configuration of the invention, in which the disc forms, in conjunction with the bottom of the cup, an external groove for a third sealing ring which seals off the cup-shaped element from the valve housing. The said disc need not necessarily be flat or of the same thickness over its entire width.

According to another characteristic of the invention, the grooves for the second and fourth sealing rings are formed by the presetting member and at least one retaining member secured removably thereto. The design of the grooves is therefore comparable with that of the grooves for the first and third sealing rings. Here again it is possible for a common element to form the missing lateral surface for the two radial grooves. A point to which special preference is given here is that the retaining member is of a cup-shaped configuration, with one edge of the cup projecting outwardly and the valve spindle passing concentrically through the bottom of the cup. In this case the edge of the cup forms the lower or inner flank of the groove for the second sealing ring. The retaining member must be held immovably in the presetting member in some appropriate manner and, if necessary, it must be secured separately. For example, the connection may be made by means of an annular bead on the retaining member and a corresponding annular groove in the resetting member. Under certain circumstances, the friction between the two parts may be sufficient to hold them. Finally, a screwed connection is also possible.

DESCRIPTION OF THE DRAWINGS

The invention will now be described in accordance with the accompanying drawing which is a vertical section through an example of an embodiment of the invention.

DESCRIPTION OF A PREFERRED EMBODIMENT

The said example of embodiment is a thermostatically controlled radiator valve, although the thermostat cap is not shown. The latter holds the closure element, in the form of valve plate 1, against the force of loading spring 2, in the form of a coil compression spring, in the closed position, in which it rests upon valve seat 4 which is integral with housing 3.

Neck part 5 of valve housing 3 has an internal thread 6 into which a cup-shaped element 7 is screwed, and bottom 8 of the cup, through which valve stem 9 passes concentrically, thus separates interior 10 of the valve from neck part 5. A circular disc 12 lies upon a step 11 in the housing, being pressed thereto by means of cup-shaped element 7.

Screwed into internal thread 13 of cup-shaped element 7 is a presetting member 14 which is also cup-shaped, but is inverted in relation to element 7, so that base 15 is at the top. Valve stem 9 passes concentrically through the said base 15 of presetting member 14. A first sealing ring 16 and a second sealing ring 17 serve to seal off the valve stem passages through cup-shaped element 7 and presetting element 14. Groove 18 for the first sealing ring 16 is formed by a central bore passing axially through cup bottom 8 on the one hand, and by the inner edge of annular disc 12 on the other hand. A groove for second sealing ring 17 is obtained in a similar manner by means of a central recess on the inside of bottom 15 of presetting member 14 and a retaining member 19. The latter is also in the form of a cup bottom 20 thereof, through which valve stem 9 passes concentrically constituting the lower side of groove 19.

The outer edge of disc 12, in conjunction with a peripheral groove of rectangular cross section at the outer edge of bottom 9, forms a groove 21 for a third sealing ring 22. A fourth sealing ring 23, located in a groove 24, is held in a similar manner, the said groove being formed by the radially outwardly projecting edge 25 of retaining member 19 and another peripheral channel of rectangular cross section at the edge of presetting member 14.

Valve interior 10 is sealed off by first sealing ring 16 and third sealing ring 22. If the said first sealing ring fails, the medium, for example hot water, can enter chamber 26. Second sealing ring 17 and fourth sealing ring 23 prevent the medium from flowing out of chamber 26. One end of loading spring 20 bears against bottom 8 of cup-shaped element 7, while the other end bears against a collar or circlip 27 on valve stem 9. The distance between circlip 27 and the inside of bottom 15 of presetting member 14 also corresponds to the maximal lift of valve plate 1. This lift may therefore be altered by screwing in presetting member 14 to a greater or lesser extent. Retaining member 19 has an outwardly projecting, peripheral, annular head 28 engaging with a corresponding annular groove in presetting member 14 and is thus locked. These two parts may also be locked together in some other known and appropriate manner.

Assembly of the four sealing rings 16, 17, 22, and 23 is simplified by the use of disc 12 and retaining member 19. The same also applies to the machining of the sealing grooves for cup-shaped element 7 and presetting member 14.

I claim:

1. A valve structure having a housing, an inlet and outlet to said housing, a valve seat in said housing between said inlet and said outlet, a cup-shaped member within said housing, a valve stem extending from said housing, said valve stem having a valve plate engageable with said valve seat, fixed seal means between said valve stem and said cup-shaped member to prevent fluid escaping from said housing, a spring on said valve stem removed from said valve seat with respect to said fixed seal means, said spring lifting said valve plate from said valve seat, a threaded member in said cup-shaped member above said fixed seal means, surrounding said spring, with the upper end of said spring engageable with said valve stem, said threaded member being adjustable by the turning to control the lift of said spring, movable seal means carried by said threaded member to prevent fluid escaping from said housing on failure of said fixed seal means and means containing said movable seal means on said threaded member in fixed relation thereto whilst movable in relation to said valve stem on said adjustment of said threaded member.

2. A valve structure according to claim 1 wherein said movable seal means includes a second sealing ring between said valve stem and said threaded member and a fourth sealing ring between said housing and said threaded member, said means containing said movable seal means including a retaining member having a first flange on said threaded member inwardly directed towards said valve stem and providing a first groove therein for said second sealing ring and a second outwardly directed flange on said threaded member and providing a second groove with said housing, said second groove and said retaining member is removably secured to said threaded member carrying said fourth sealing ring.

3. A valve structure according to claim 2 wherein a guide member is located in said housing, said guide member being interiorly threaded with said threaded member threaded therein, said fixed seal means including a first sealing ring located between said valve stem and guide member and a third sealing ring located between said guide member and said housing.

* * * * *